United States Patent
Sagasaki et al.

(10) Patent No.: US 6,862,492 B2
(45) Date of Patent: Mar. 1, 2005

(54) NUMERICALLY CONTROLLED APPARATUS

(75) Inventors: Masakazu Sagasaki, Tokyo (JP); Toshihiro Niwa, Aichi (JP); Takashi Itoh, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/476,383
(22) PCT Filed: Oct. 3, 2001
(86) PCT No.: PCT/JP01/08712
§ 371 (c)(1), (2), (4) Date: Oct. 30, 2003
(87) PCT Pub. No.: WO03/032097
PCT Pub. Date: Apr. 17, 2003

(65) Prior Publication Data
US 2004/0153199 A1 Aug. 5, 2004

(51) Int. Cl.[7] .............................................. G06F 19/00
(52) U.S. Cl. ........................ 700/159; 700/249; 318/565
(58) Field of Search ................................ 700/159, 247, 700/249, 79, 61; 318/568.24, 565

(56) References Cited

U.S. PATENT DOCUMENTS 5,173,648 A * 12/1992 Kawamura et al. ..... 318/568.13
5,444,343 A * 8/1995 Enomoto et al. ...... 318/568.11
6,029,098 A * 2/2000 Serizawa et al. ........... 700/188
6,401,005 B1 * 6/2002 Schwarz et al. ............ 700/159

FOREIGN PATENT DOCUMENTS

| JP | 60-150105 A | 8/1985 |
|---|---|---|
| JP | 3-104595 A | 5/1991 |
| JP | 7-152416 A | 6/1995 |
| JP | 11-212617 A | 8/1999 |

* cited by examiner

Primary Examiner—Kidest Bahta
(74) Attorney, Agent, or Firm—Sughrue Mion, PLLC

(57) ABSTRACT

By using a configuration comprising sampling means for sampling block end information about each system program, means for identifying a resumption block and a resumption position of each system based on the block end information of each system at the time of a machining halt, and means for calculating information about a synchronous relation between the systems from the block end information of each system and resuming and starting each system based on this calculated result when machining is resumed from the resumption position, it is constructed so that the synchronous relation between the systems can be restored to resume the machining even in a numerical control apparatus in correspondence with multiple systems.

11 Claims, 10 Drawing Sheets

| HISTORY DATTA | CONTENT |
|---|---|
| M6 | CHUCK CLOSED |
| M3 | MAIN SPINDLE NORMAL ROTATION |
| M5 | MAIN SPINDLE STOP |
| M7 | CHUCK OPEN |
| ⋮ | ⋮ |

```
EDIT

O      1000        4500 CHAR $1                  $2                  $3
  G28 XZ ;            G28 XZ ;            G28 XZ ;
  G0 X10 ;            G0 Z20 ;            G0 X10. Z10. ;
  G98 G1 Z10. F100;   G98 G1X30. Z30.
                      F200;
   ⋮                   ⋮                   ⋮
```

NUMERICALLY CONTROLLED APPARATUS

TECHNICAL FIELD

The present invention relates to a numerical control apparatus in correspondence with multiple systems capable of executing machining programs in parallel, and particularly to a program resumption function.

BACKGROUND ART

A numerical control apparatus is an apparatus for performing numerical control processing based on a machining program commanded from a paper tape etc., and driving a machine tool by the processing result and subjecting a work to the machining as commanded.

FIG. 10 is a main block diagram showing a conventional numerical control apparatus.

In the drawing, numeral 101 shows a numerical control apparatus, and comprises an analysis processing part 103, an interpolation processing part 104, a machine control signal processing part 106, a PLC circuit 105, an NC spindle control part 180, a main spindle control part 110, a data input/output circuit 120, memory 107, a parameter setting part 108 and a screen processing part 109. Also, the numerical control apparatus 101 is coupled to a servo driving apparatus 201 through the data input/output circuit 120 to drive an NC spindle 204. Also, the numerical control apparatus 101 is coupled to a main spindle driving apparatus 301 through the data input/output circuit 120 to drive a main spindle 304.

Numeral 102 is a machining program, and the machining program 102 read from a tape reader etc., is stored in the memory 107.

As shown in FIG. 12, in this machining program 102, three kinds ($1: system 1, $2: system 2, $3: system 3) are managed as one machining program. This is generally referred to as a multiple-system machining program, and the present numerical control apparatus 101 can analyze and execute the multiple system machining program in parallel.

When the multiple-system machining program is applied to a configuration of a machine tool, for example, it becomes as shown in FIG. 11.

That is, the present machine tool is configured by a first tool rest, a second tool rest and a third tool rest. A front workpiece is machined by a tool mounted in the first tool rest, a tool mounted in the second tool rest, and a tool mounted in the third tool rest, respectively. Also, an opposed workpiece is machined by the tool mounted in the second tool rest. Here, a machining program of the system 1 is allocated to the first tool rest, a machining program of the system 2 is allocated to the second tool rest and a machining program of the system 3 is allocated to the third tool rest.

Next, blocks of the machining program 102 of each the system are read out of the memory 107 one by one and are respectively analyzed by the analysis processing part 103. A code analyzed every one block is passed to the interpolation processing part 104, and according to a command, interpolation control, main spindle control, auxiliary function control, etc., every one block are performed. The NC spindle control part 180 performs control for positioning or interpolation feeding, etc., according to interpolation data with respect to an NC spindle. The main spindle control part 110 performs control for performing actions such as rotation of a main spindle by a commanded number of revolutions, a stop, an orientation action of the main spindle with respect to a main spindle commanded.

The servo driving apparatus 201 is coupled to a servo motor 202 and drives the NC spindle 204 through gears, ball screws, etc., by position control by means of position feedback from a detector 205.

The main spindle driving apparatus 301 is coupled to a main spindle motor 302 through gears etc., and drives the main spindle 304. A detector 305 is mounted in the main spindle 304 and the main spindle driving apparatus 301 can control an orientation action of the main spindle motor 302 by position data inputted from the detector.

By the way, the numerical control apparatus preferably has a program resumption function (a function of halting the machining and evacuating and replacing a tool and then returning the evacuated tool and then resuming the machining when the tool breaks or wears during the machining).

In a numerical control apparatus in correspondence with a single system (only a system 1), the program resumption function has been present conventionally, but in a machine tool equipped with a numerical control apparatus in correspondence with multiple systems, generally, the number of control spindles is very large and it is very difficult to restore a synchronous relation between the systems and resume machining, so that the program resumption function for restoring the synchronous relation between the systems and resuming the machining has not been present yet in the numerical control apparatus in correspondence with multiple systems described above.

DISCLOSURE OF THE INVENTION

This invention is implemented to solve the problem as described above, and an object of the invention is to obtain a numerical control apparatus having a program resumption function for restoring a synchronous relation between systems to resume machining.

This invention is implemented to achieve the object, and in a numerical control apparatus in correspondence with multiple systems capable of executing machining programs in parallel, there is provided a configuration including: sampling means for sampling block end information of each system program; means for identifying a resumption block and a resumption position of each system based on the block end information of each system at the time of a machining halt; and means for calculating information about a synchronous relation between the systems from the block end information of each system and resuming and starting each system based on this calculated result when machining is resumed from the resumption position.

Also, the block end information for identifying the resumption position and the resumption block has block end time of each system, a machine coordinate value of each control spindle and a block number of the machining program of each system.

Also, the block end information for identifying the resumption position and the resumption block has block end time of each system, a machine coordinate value of each control spindle, a block number of the machining program of each system and an override value.

Also, the information about a synchronous relation between the systems at the time of machining resumption is starting latency time calculated from the block end time of each system.

Also, the information about a synchronous relation between the systems at the time of machining resumption is starting latency time calculated from block end time of each system program and an override value.

Also, it is constructed so that machining resumption from the resumption position starts from the system with starting latency time of zero and sequentially starts from the system in which execution time matches with starting latency time.

Also, this invention provides means for resuming machining without returning an evacuated control spindle after a machining halt to a resumption position before machining resumption.

Also, there is provided means for checking whether an absolute position movement command is described with respect to all control spindles belonging to the system to which a control spindle which does not return to a resumption position belongs in a movement block subsequent to machining resumption of the system.

Further, this invention provides means for storing a coordinate value of each control spindle at the time of a machining start, and means for restoring the coordinate value of each control spindle stored before performing a search for resuming machining after the machining halt.

BEST MODE FOR CARRYING OUT THE INVENTION

First Embodiment

A first embodiment of the present invention will be described below based on FIGS. 1 to 9 and FIG. 12.

Figure 1:
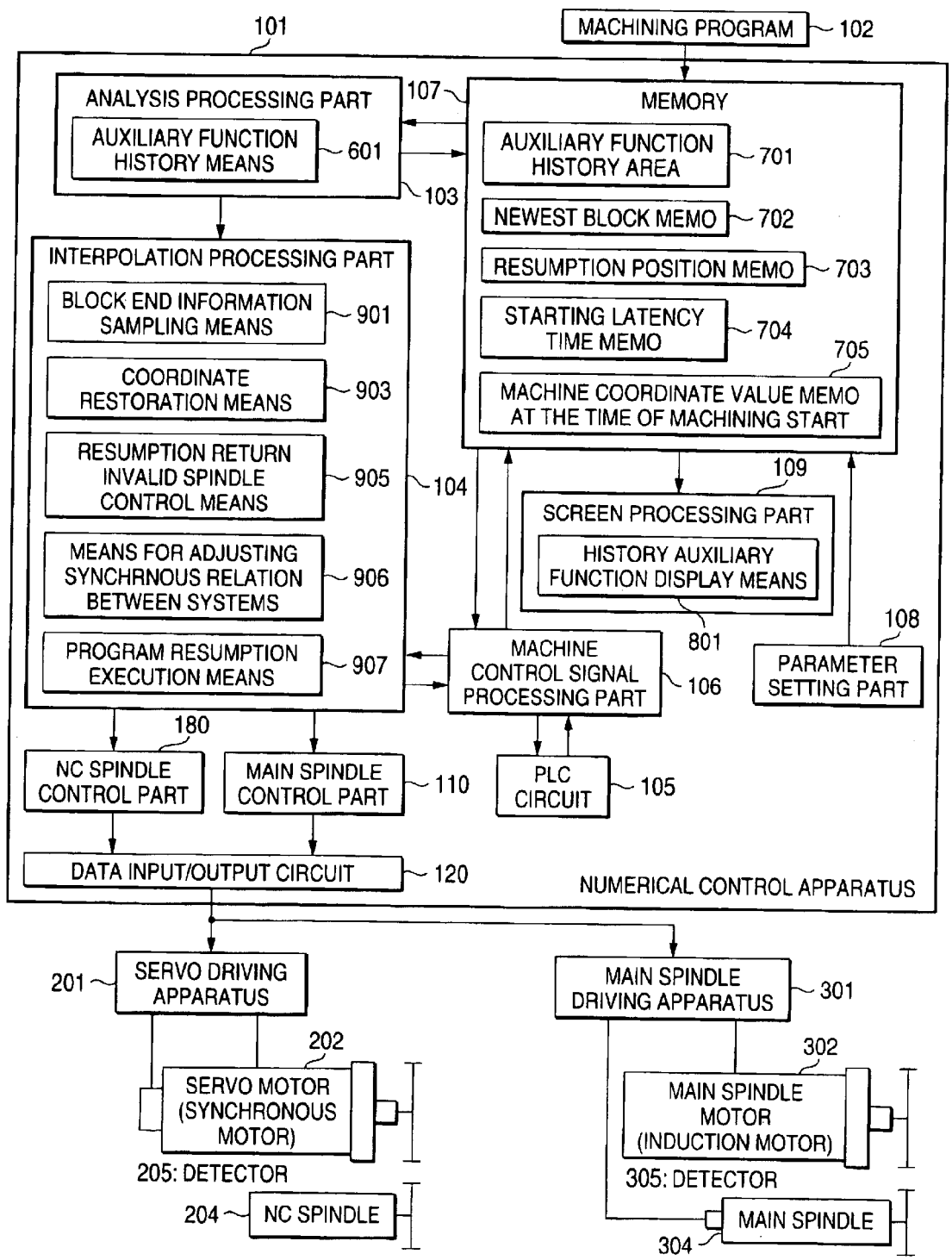
FIG. 1 is a main block diagram about a program resumption function according to a first embodiment of the present invention.
Figure 10:
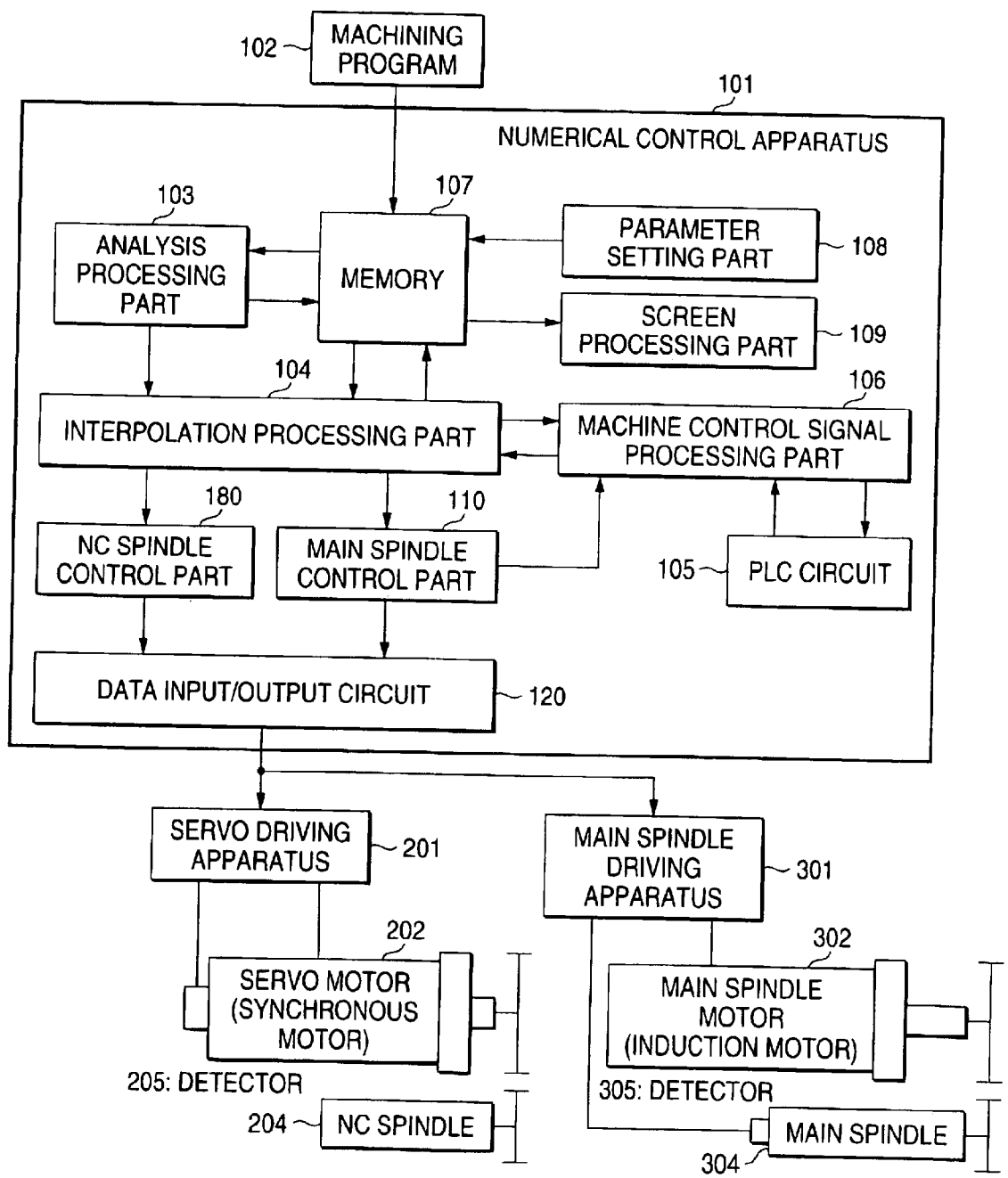
FIG. 10 is a main block diagram of a conventional numerical control apparatus.

FIG. 1 is a main block diagram describing the first embodiment of a numerical control apparatus. In comparison with a conventional block diagram shown in FIG. 10, it is characterized in that auxiliary function history means 601 is added to an analysis processing part 103 and also, block end information sampling means 901, coordinate restoration means 903, resumption return invalid spindle control means 905, means 906 for adjusting a synchronous relation between systems, and program resumption execution means 907 are added to an interpolation processing part 104 and also, an auxiliary function history area 701, a newest block memo 702, a resumption position memo 703, a starting latency time memo 704, and a machine coordinate value memo 705 at the time of a machining start are added to memory 107 and further, history auxiliary function display means 801 is added to a screen processing part 109. Incidentally, things having the same numerals as those of a conventional example designate the same things as those described in the conventional example.

Figures 11, 12:
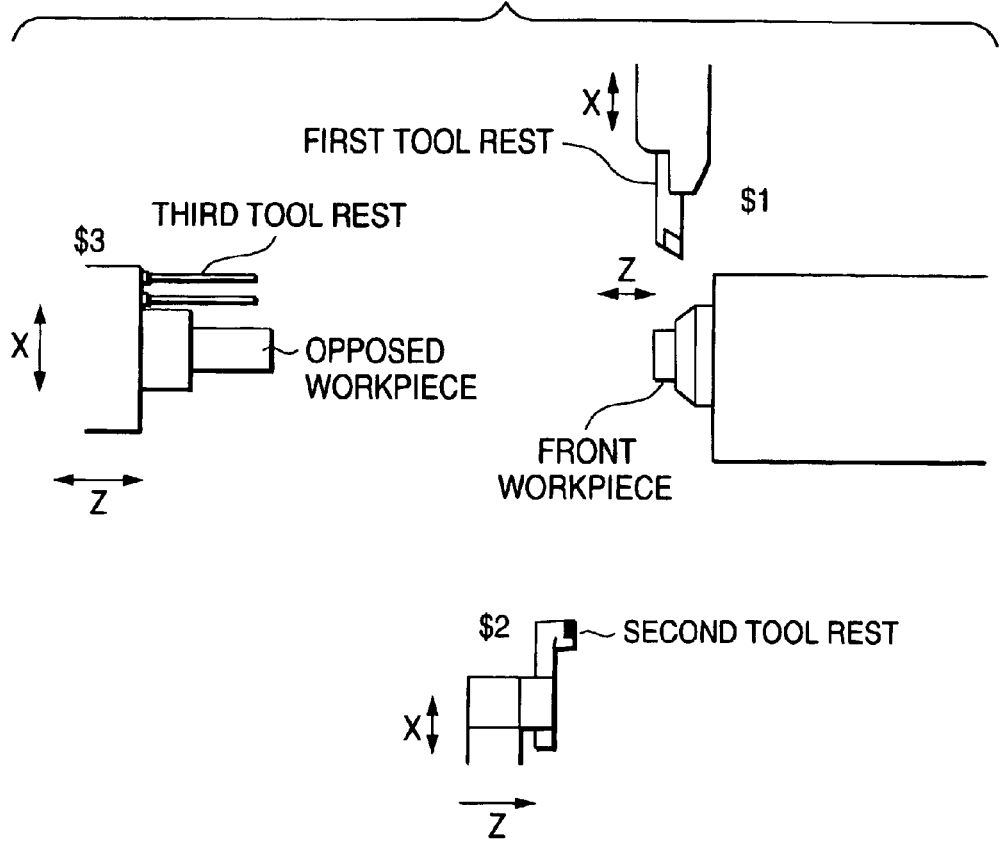
FIG. 11 is a diagram showing a machine configuration example in correspondence with a multiple-system machining program.
FIG. 12 is a diagram showing a multiple-system machining program example.

Next, program resumption processing which is a feature of the present first embodiment will be described using the block diagram of FIG. 1, timing charts of FIGS. 2 and 3, flowcharts of program resumption processing of FIGS. 4, 5 and 7, an auxiliary function history display screen example of FIG. 6, and a multiple-system machining program example of FIG. 12.

Figure 4:
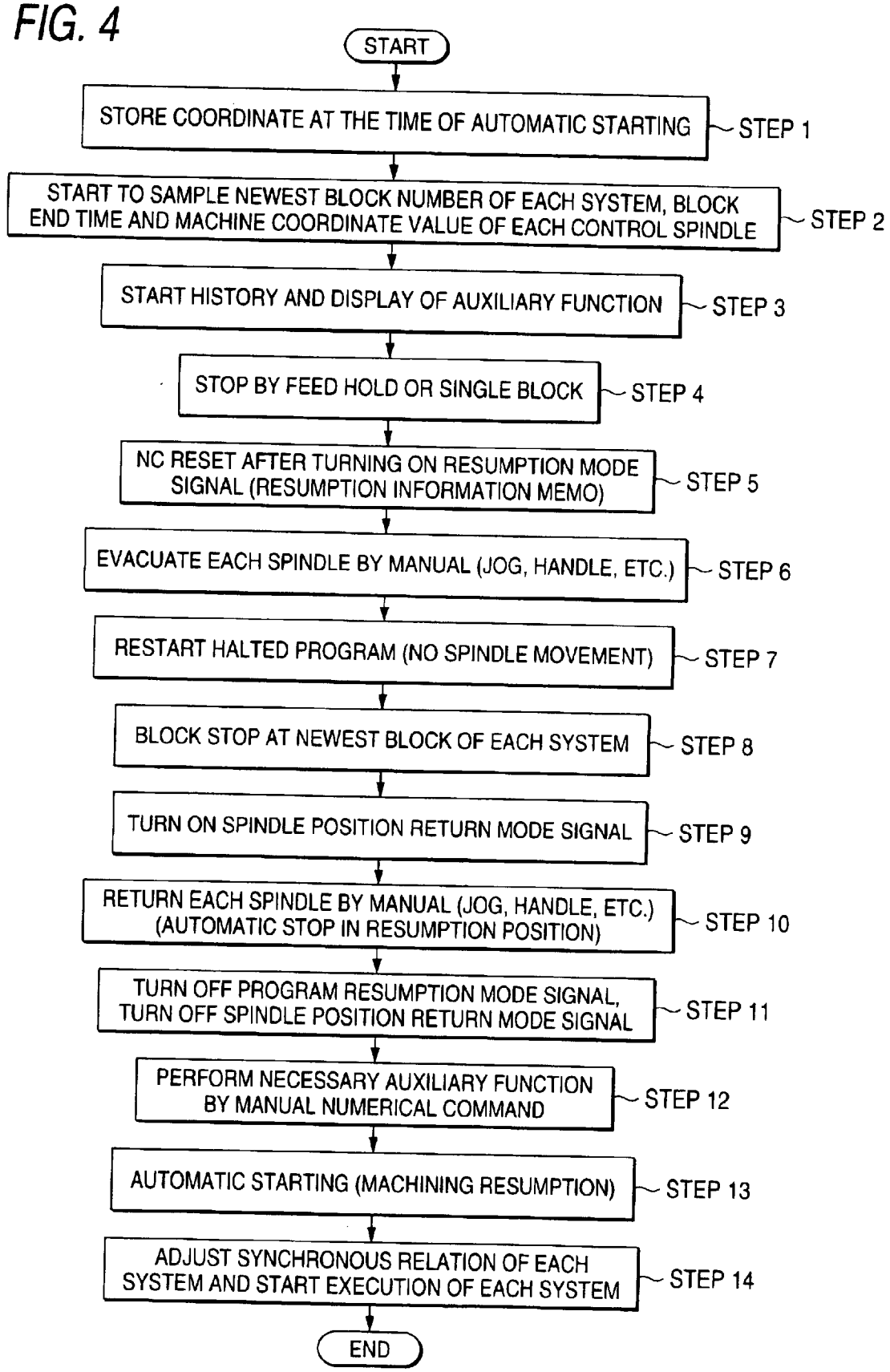
FIG. 4 is a flowchart describing an action of the program resumption function according to the first embodiment of the present invention.

In FIG. 4, in step 1, an operation search of a machining program which an operator wants to operate is performed and an operation mode is switched to a memory operation mode and automatic starting is performed (machining is started). At this time, the coordinate restoration means 903 stores a machine coordinate value of each control spindle in the machine coordinate value memo 705 at the time of the machining start of the memory 107.

In step 2, the block end information sampling means 901 starts to sample (overwrite each information every the completion of block execution of each system) the newest block number of each system, block processing end time corresponding to the block number and the machine coordinate value of each the control spindle belonging to the system at the time of the block processing end corresponding to the block number in the memory 107. For example, as shown in a machining program of FIG. 12, in system 1, each block number, time at the time of the block processing end and a machine coordinate value of a control spindle belonging to the system 1 of G28XZ;, G0X10.;, G98G1Z10.F100; are sampled in the memory 107. In system 2, each block number, time at the time of the block processing end and a machine coordinate value of a control spindle belonging to the system 2 of G28XZ;, G0Z20.;, G98G1X30.Z30.F200; are sampled in the memory 107. In system 3, each block number, time at the time of the block processing end and a machine coordinate value of a control spindle belonging to the system 3 of G28XZ;, G0X10.Z10.; are sampled in the memory 107.

Figures 6, 7:
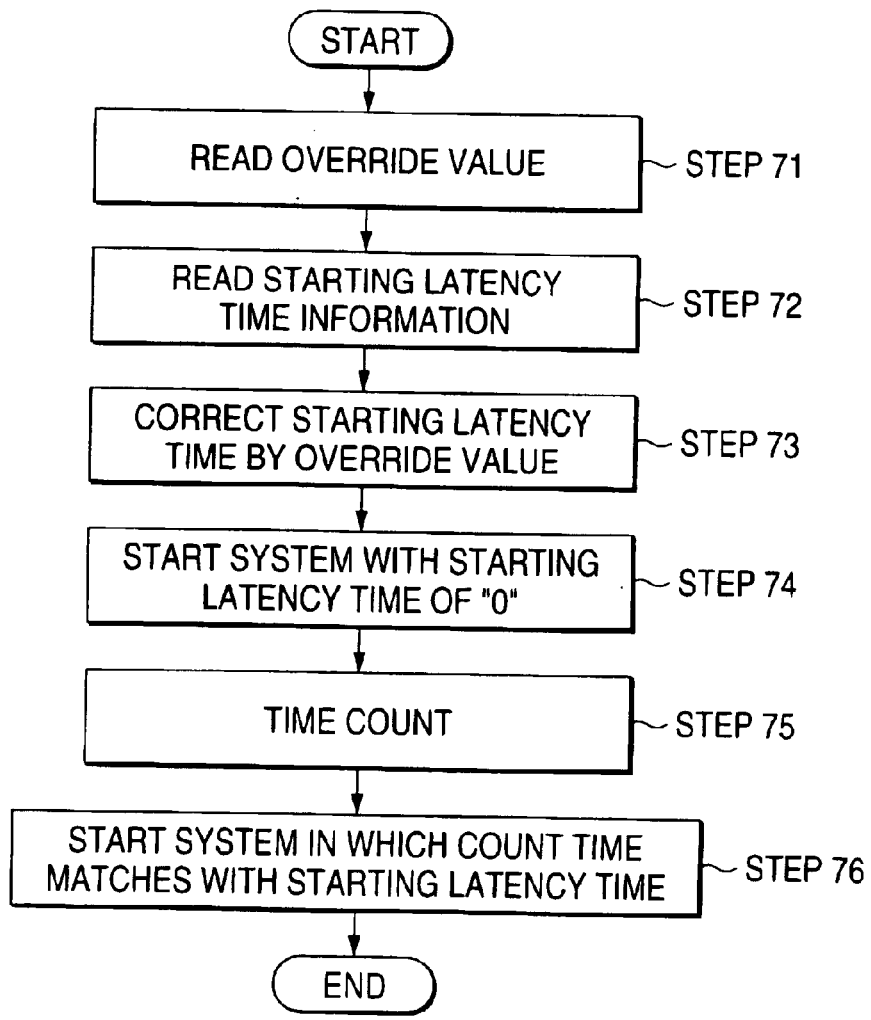
FIG. 6 is a diagram showing one example of auxiliary function history display of the program resumption function according to the first embodiment of the present invention.
FIG. 7 is a flowchart describing an action for restoring a synchronous relation between systems at the time of machining resumption of the program resumption function according to the first embodiment of the present invention.

In step 3, the auxiliary function history means 601 writes an auxiliary function analyzed by the analysis processing part 103 into the auxiliary function history area 701 of the memory 7 and also, the history auxiliary function display means 801 reads out auxiliary function information written into the auxiliary function history area 701 and displays an auxiliary function history list on a screen of a numerical control apparatus 101 as shown in FIG. 6.

In step 4, the operator stops execution of the machining program by a feed hold. In FIG. 2, a feed hold signal 1004 is inserted into each of the blocks of G1X98.Z10.5; in the system 1, G1Z38.5F0.6; in the system 2 and G0Z-13.; in the system 3.

In step 5, the operator turns on a program resumption mode switch allocated to a machine operation panel. A signal of the switch is inputted to a machine control signal processing part 106 through a PLC circuit 105. Then, when the signal of the switch is inputted to the machine control signal processing part 106, the interpolation processing part 104 performs calculation processing of starting latency time of each the system at the time of resumption of the machining program in cooperation with the memory 107 etc.

Figure 5:
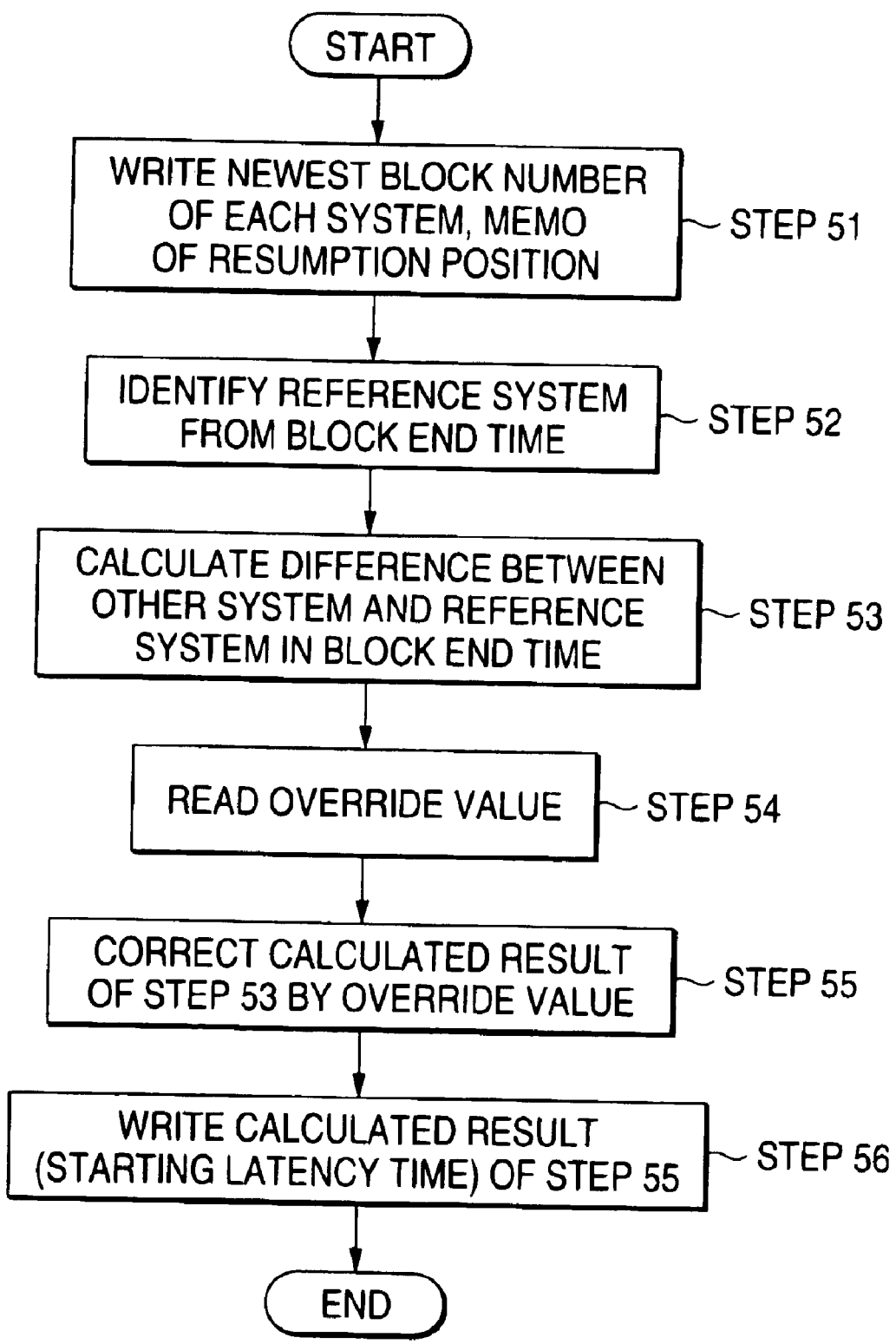
FIG. 5 is a flowchart describing an action for calculating starting latency time of the program resumption function according to the first-embodiment of the present invention.

Incidentally, the calculation processing of this starting latency time is performed as shown in FIG. 5.

That is, in FIG. 5, in step 51, when the program resumption execution means 907 detects a program resumption mode signal from the machine control signal processing part 106, the newest block number of each the system among block end information of each the system sampled by the block end information sampling means 901 is written into the newest block memo 702. The 30th block 1001 in the system 1 of FIG. 2, the 21st block 1002 in the system 2 and the 19th block 1003 in the system 3 correspond to the newest blocks. Also, the program resumption execution means 907 writes a machine coordinate value of a control spindle at the time of the newest block end of each the system sampled by the block end information sampling means 901 into the resumption position memo 703 every system.

In step 52, the program resumption execution means 907 reads out newest block end time of each the system sampled and identifies the system with the shortest time as a reference system. Then, the means 906 for adjusting the synchronous relation between the systems is notified of the newest block end time of each the system and the reference system. For example, in the case of FIG. 2, end time of a block of G0X100.; of the system 1, end time of G0Z14.21; of the system 2 and end time of G1Z55.5F100; of the system 3 are read out and the means 906 for adjusting the synchronous relation between the systems is notified of the system 2 with the shortest end time as the reference system.

In step 53, the means 906 for adjusting the synchronous relation between the systems receives notification from the program resumption execution means 907, and calculates a difference between block end time of the reference system and block end time of the other system. That is, (block end time of a system other than the reference system)—(block end time of the reference system) is calculated and difference time of the reference system is set to 0 ms. For example, it is assumed that the following result is obtained.

| System | Difference time (ms) |
| --- | --- |
| System 1 | 3000 |
| System 2 | 0 |
| System 3 | 11200 |

In step 54, the means 906 for adjusting the synchronous relation between the systems reads information about a value (hereinafter called "override value") of an override (a manual control function in which a worker can temporarily change a feed speed during working) out of the machine control signal processing part 106.

In step 55, the means 906 for adjusting the synchronous relation between the systems calculates starting latency time at the time of machining resumption from the calculated result (difference time) of step 53 and the override value read in step 54 (starting latency time is converted into the case of an override value of 100%)

Incidentally, the reason why the starting latency time is converted into the case of the override value of 100% thus is because there is a possibility that an override value at the time of a halt differs from an override value at the time of resumption.

For example, when it is assumed that an override value at the time of a halt is 50%, the system 1 becomes 3000×0.5=1500 and the system 3 becomes 11200×0.5=5600 and the following result is obtained.

| System | Starting latency time (ms) |
| --- | --- |
| System 1 | 1500 |
| System 2 | 0 |
| System 3 | 5600 |

Figure 2:
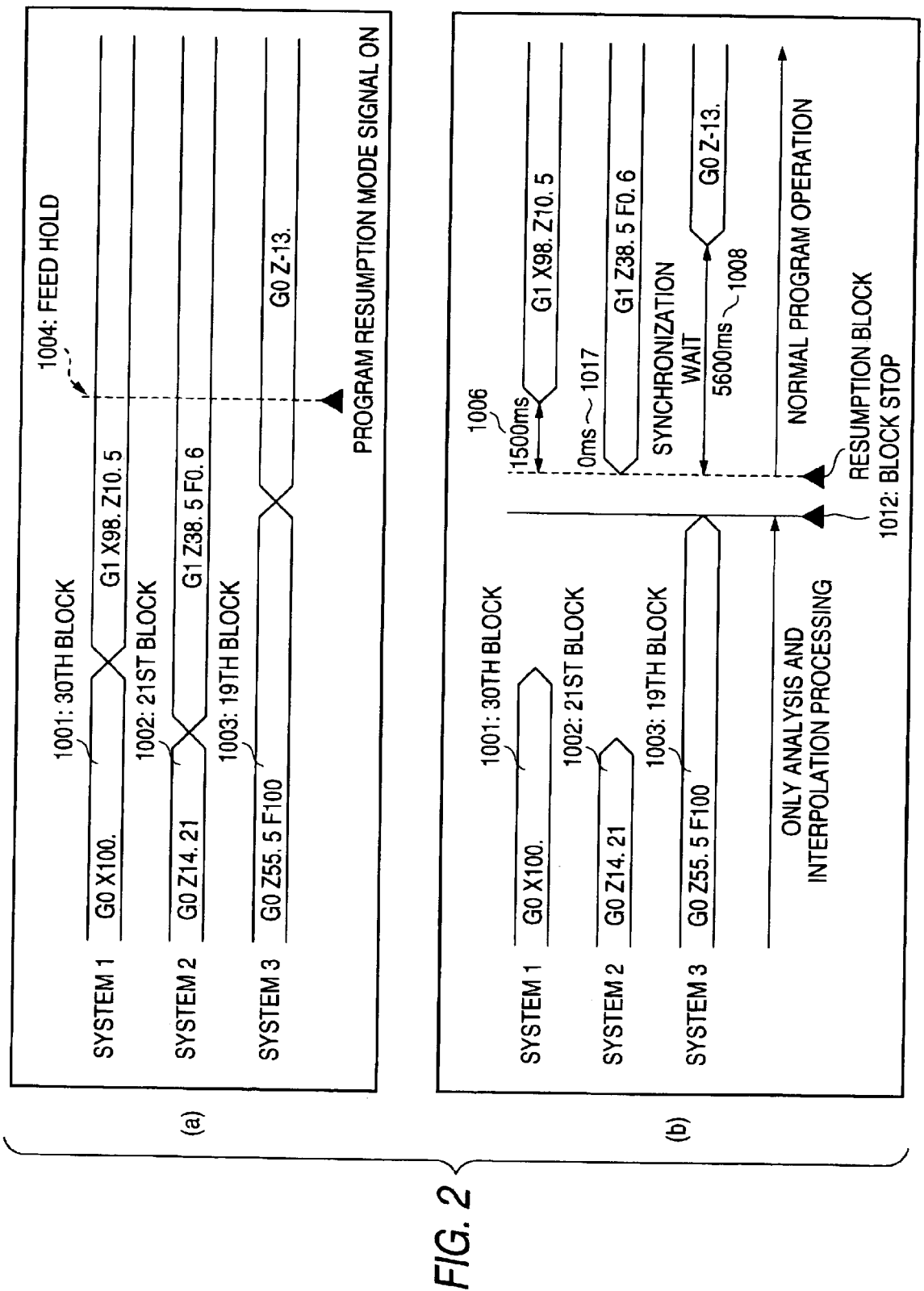
FIG. 2 is a diagram showing a timing chart of a program resumption function after a feed hold stop in a numerical control apparatus in correspondence with multiple systems according to the first embodiment of the present invention.

That is, in conversion of FIG. 2, 1500 ms of 1006 of the system 1, 0 ms of 1007 of the system 2 and 5600 ms of 1008 of the system 3 correspond this.

In step 56, the means 906 for adjusting the synchronous relation between the systems writes the starting latency time into the starting latency time memo 705.

In step 5 in FIG. 4, the program resumption execution means 907 switches a flow of processing so that the machine control signal processing part 106, an NC spindle control part 180 and a main spindle control part 110 are not notified of a processing result of the interpolation processing part 104 at the time of restarting a halted machining program 104 from the head by a memory operation mode in order to update a machine coordinate value or modal information. Next, the operator performs NC reset. As a result of this, an automatic operation state of the numerical control apparatus 101 is released.

In step 6, the operator evacuates a necessary spindle to a place in which the operator is easy to work by manual manipulation of a handle etc. Here, the operator can perform replacement of a tool and measurement of a tool length.

In step 7, the operator performs a search for machining resumption of the halted machining program (restarting from the head of the machining program by the memory operation mode. However, in step 5, the program resumption execution means 907 switches the flow of processing so that the machine control signal processing part 106, the NC spindle control part 180 and the main spindle control part 110 are not notified of the processing result of the interpolation processing part 104, so that spindle movement is not performed by an action of only the analysis processing part 103 and the interpolation processing part 104. The modal information and the machine coordinate value are updated.). At the time of this start, the machine coordinate value of each the control spindle stored in the machine coordinate value memo 705 at the time of the machining start by the coordinate restoration means 903 in step 1 is readout and is written (restored) into a machine coordinate value table of each the control spindle.

Incidentally, the reason why the machine coordinate value of each the control spindle stored in the machine coordinate value memo 705 at the time of the machining start by the coordinate restoration means 903 in step 1 is read out and is written into the machine coordinate value table of each the control spindle at the time of the start of the search for machining resumption of the machining program thus is as follows.

That is, when a machine coordinate value at the time of a machining start does not reside and only a machine coordinate value at the time of a halt resides, since data is updated from the machine coordinate value at the time of the machining halt in the search for machining resumption after the machining halt, when a reference point return command of G28 etc., is absent in the head of the halted machining program, the machine coordinate value does not return to an initial value and the machine coordinate value is not updated from the initial value, so that a machine coordinate value after the search completion differs from that of the previous time and a positional deviation occurs and the machining resumption cannot be performed normally.

Next, in step 8, the program resumption execution means 907 checks whether to be analyzed to the newest block written into the newest block memo 702 every system and in the case of being analyzed to the newest block, a block stop is made at the block. In FIG. 2, a block stop 1012 is made at the 30th block 1001 in the system 1, the 21st block 1002 in the system 2 and the 19th block 1003 in the system 3.

Instep 9, the operator turns on a program spindle position return valid switch allocated to the machine operation panel. A signal of the switch is inputted to the machine control signal processing part 106 through the PLC circuit 105. When the program resumption execution means 907 detects a program spindle position return valid signal from the machine control signal processing part 106, the machine coordinate value of each the control spindle is read out of the resumption position memo 703.

In step 10, the operator returns the spindle evacuated by the manual manipulation of a handle etc., in step 6 to a resumption position. At this time, the program resumption execution means 907 monitors a machine coordinate value of a spindle manipulated by the operator and in the case of matching with the machine coordinate value read out in step 9, movement of the spindle is stopped. As a result of this, the operator can accurately return the evacuated spindle to the resumption position.

In step 11, the operator turns off each of the program resumption mode switch and the program spindle position return valid switch turned on in step 5 and step 9. At this time, the program resumption execution means 907 checks whether or not each the control spindle returns to the resumption position and when there is the spindle which does not return to the resumption position, an alarm is given.

In step 12, the operator sees a history list of an auxiliary function displayed on a screen of the numerical control apparatus 101 as shown in FIG. 6, and the auxiliary function necessary at the time of the machining resumption is performed by a manual numerical command which is a function conventionally held by the numerical control apparatus 101.

In step 13, the operator performs automatic starting by the memory operation mode and executes resumption of machining. At this time, the program resumption execution means 907 commands monitoring of execution start timing of each the system with respect to the means 906 for adjusting the synchronous relation between the systems.

In step 14, the means 906 for adjusting the synchronous relation between the systems adjusts a synchronous relation of each the system and sequentially starts each the system.

Next, processing for adjusting this synchronous relation between the systems and sequentially starting each the system will be described using a flowchart of FIG. 7.

That is, in step 71, the means 906 for adjusting the synchronous relation between the systems reads information about an override value out of the machine control signal processing part 106. Incidentally, a purpose of this reading is to make a correction to latency time of the newest override value as described below.

In step 72, the means 906 for adjusting the synchronous relation between the systems reads starting latency time of each the system out of the starting latency time memo 704. Incidentally, the starting latency time stored in the starting latency time memo 704 is starting latency time of the case of an override value of 100% as described by using FIG. 5.

In step 73, the final starting latency time is calculated from the starting latency time and the override value read. For example, the final starting latency time of the case that the override value is 100% is as follows, and

| System | Final starting latency time (ms) |
|---|---|
| System 1 | 1500 |
| System 2 | 0 |
| System 3 | 5600 | the final starting latency time of the case that the override value is 20% is as follows.

| System | Final starting latency time (ms) |
|---|---|
| System 1 | 7500 |
| System 2 | 0 |
| System 3 | 28000 |

In step 74, the means 906 for adjusting the synchronous relation between the systems starts to execute (starting) the system with information about the final starting latency time of "0". In FIG. 2, it starts to execute the system 2.

In step 75, the means 906 for adjusting the synchronous relation between the systems starts to count execution time.

In step 76, the means 906 for adjusting the synchronous relation between the systems compares the execution time with the final starting latency time and sequentially starts execution from the system matching. As a result of this, the synchronous relation of each the system can be restored to resume the machining. In FIG. 2, the system 1 and the system 3 are sequentially started.

Figure 3:
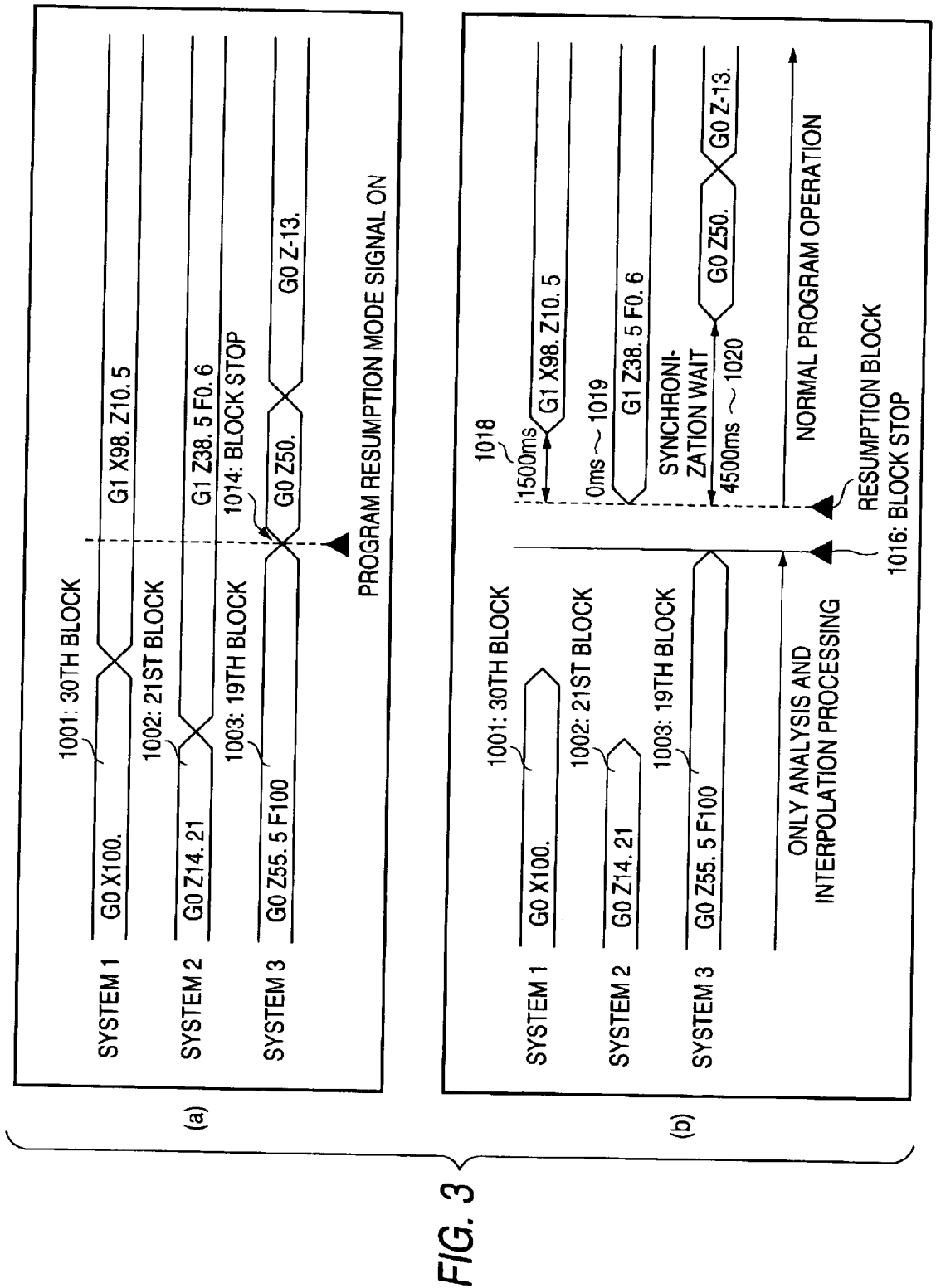
FIG. 3 is a diagram showing a timing chart of a program resumption function after a block stop in the numerical control apparatus in correspondence with multiple systems according to the first embodiment of the present invention.

In the above description, the program resumption action of the case that the operator stops the machining by the feed hold has been described, but as shown in FIG. 3, similarly in the case that the operator makes a block stop 1014 of the machining, starting latency time calculated from the block end time of each the system program and the override value can be calculated.

| System | starting latency time (ms) |
|---|---|
| System 1 | 1500 |
| System 2 | 0 |
| System 3 | 4500 |

That is, in FIG. 3, 1500 ms of 1018 of the system 1, 0 ms of 1019 of the system 2 and 4500 ms of 1020 of the system 3 correspond this.

Next, after the machining resumption, the means 906 for adjusting the synchronous relation between the systems calculates the final starting latency time from starting latency time and an override value. For example, the final starting latency time of the case that the override value is 100% is as follows.

| System | Final starting latency time (ms) |
|---|---|
| System 1 | 1500 |
| System 2 | 0 |
| System 3 | 4500 |

Then, the means 906 for adjusting the synchronous relation between the systems starts to execute (starting) the system (system 2 in FIG. 3) with information about the final starting latency time of "0", and also starts to count execution time, and further compares the execution time with the final starting latency time and sequentially starts execution from the system matching. In FIG. 3, the execution is started in order of the system 1, the system 3. As a result of this, the synchronous relation of each the system can be restored to resume the machining in a manner similar to the case of the feed hold.

Incidentally, in the present embodiment, the case of calculating the latency time in consideration of the override value allowing for the possibility that the override value at the time of the machining halt differs from the override value at the time of the machining resumption has been described, but in the case that the override value at the time of the machining halt does not differ from the override value at the time of the machining resumption, it is unnecessary to consider the override value on calculation of the latency time.

By the way, in a machine tool equipped with a numerical control apparatus in correspondence with multiple systems, the number of control spindles is very large generally, so that when the program resumption function for restoring the synchronous relation between the systems and resuming the machining is provided in the numerical control apparatus in correspondence with multiple systems described above, it becomes considerably difficult for an operator to return all the control spindles evacuated or moved after the machining halt to the resumption position.

Figure 8:
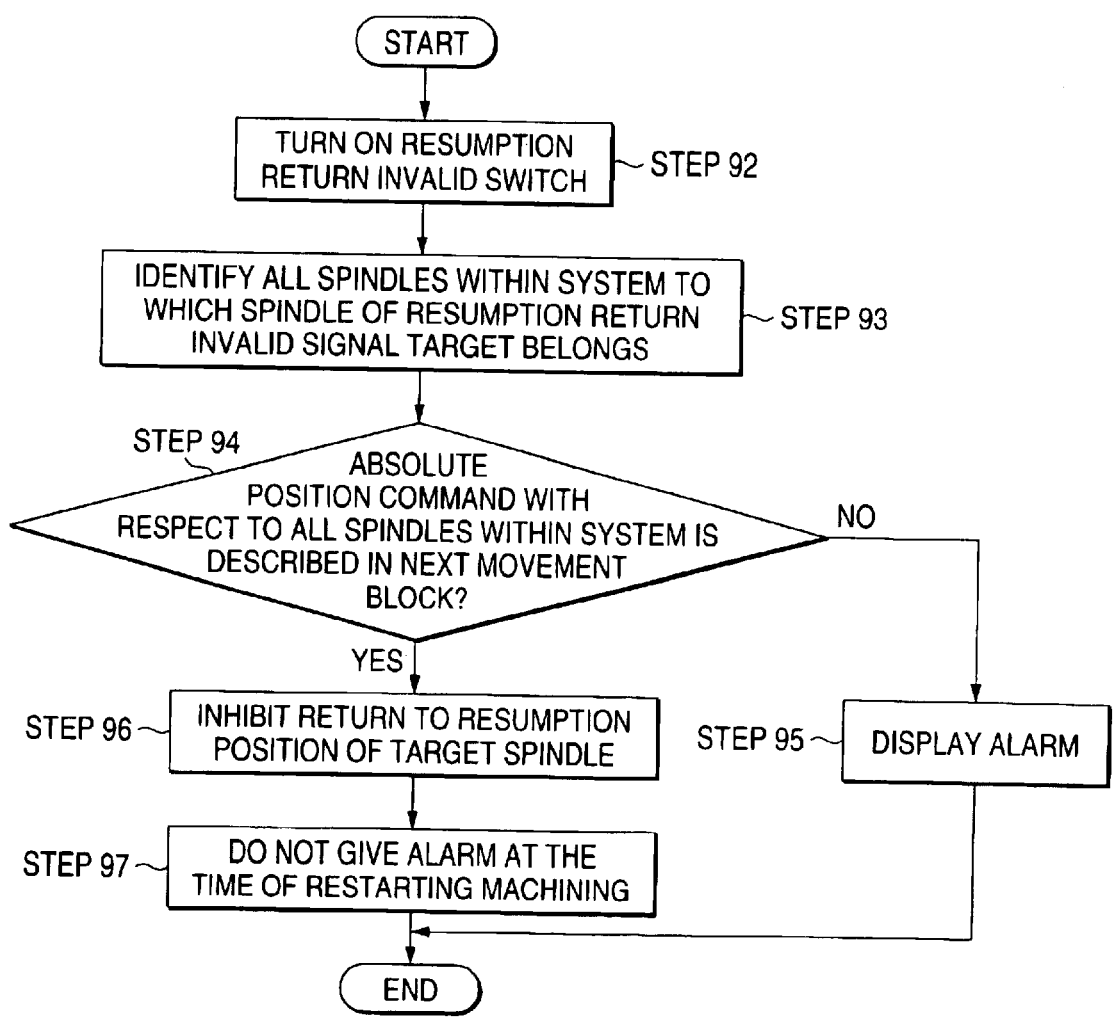
FIG. 8 is a flowchart describing an action of a resumption return invalid spindle of the program resumption function according to the first embodiment of the present invention.

Thus, also in order to improve this point, the present first embodiment is constructed so that machining can be resumed without returning a spindle evacuated by an operator to a resumption position as shown in FIG. 8.

That is, a machining resumption action of the case that the spindle evacuated by the operator is not returned to the resumption position in step 10 of the flowchart of FIG. 4 will be described using a flowchart of FIG. 8.

That is, in step 92, the operator turns on a resumption return invalid switch corresponding to a spindle, which the operator does not want to returned to a resumption position. A signal of the switch is inputted to the machine control signal processing part 106 through the PLC circuit 105.

In step 93, the resumption return invalid spindle control means 905 receives notification from the machine control signal processing part 106, and identifies all the spindles within the system to which the spindle of a resumption return invalid signal target belongs from information about the interpolation processing part 104.

In step 94, the resumption return invalid spindle control means 905 retrieves a machining program during the machining halt, and identifies the first movement block after the machining resumption. Then, it is analyzed whether an absolute position command with respect to all the spindles within the system identified in step 93 is described in the block. When the absolute position command with respect to all the spindles within the system is described, the flowchart proceeds to step 96. When the absolute position command with respect to all the spindles within the system is not described, the flowchart proceeds to step 95.

In step 95, the absolute position command is not described or an incremental position command is described with respect to all the spindles within the system, so that there is a possibility that a positional deviation occurs after the machining resumption. Therefore, an alarm message is displayed to the operator. The alarm message is displayed on a screen of the numerical control apparatus 101 by the resumption return invalid spindle control means 905 through the memory 107 and the screen processing part 109.

In step 96, the resumption return invalid spindle control means 905 inhibits return to the resumption position with respect to a corresponding spindle.

In step 97, it is set so as not to give an alarm in the case that the control spindle evacuated and moved has not returned to the resumption position and the case that a spindle position return valid signal has become OFF. That is, even in the case that the operator performs manual manipulation of a handle etc., with respect to a corresponding spindle, the corresponding spindle does not move from an evacuated position and also, even in the case that the operator turns off a spindle position return valid switch, the alarm is not given and the halted machining program can be resumed. Next, when the operator performs automatic starting by the memory operation mode and executes resumption of machining, the corresponding spindle is positioned directly by a movement command from the evacuated position.

Figure 9:
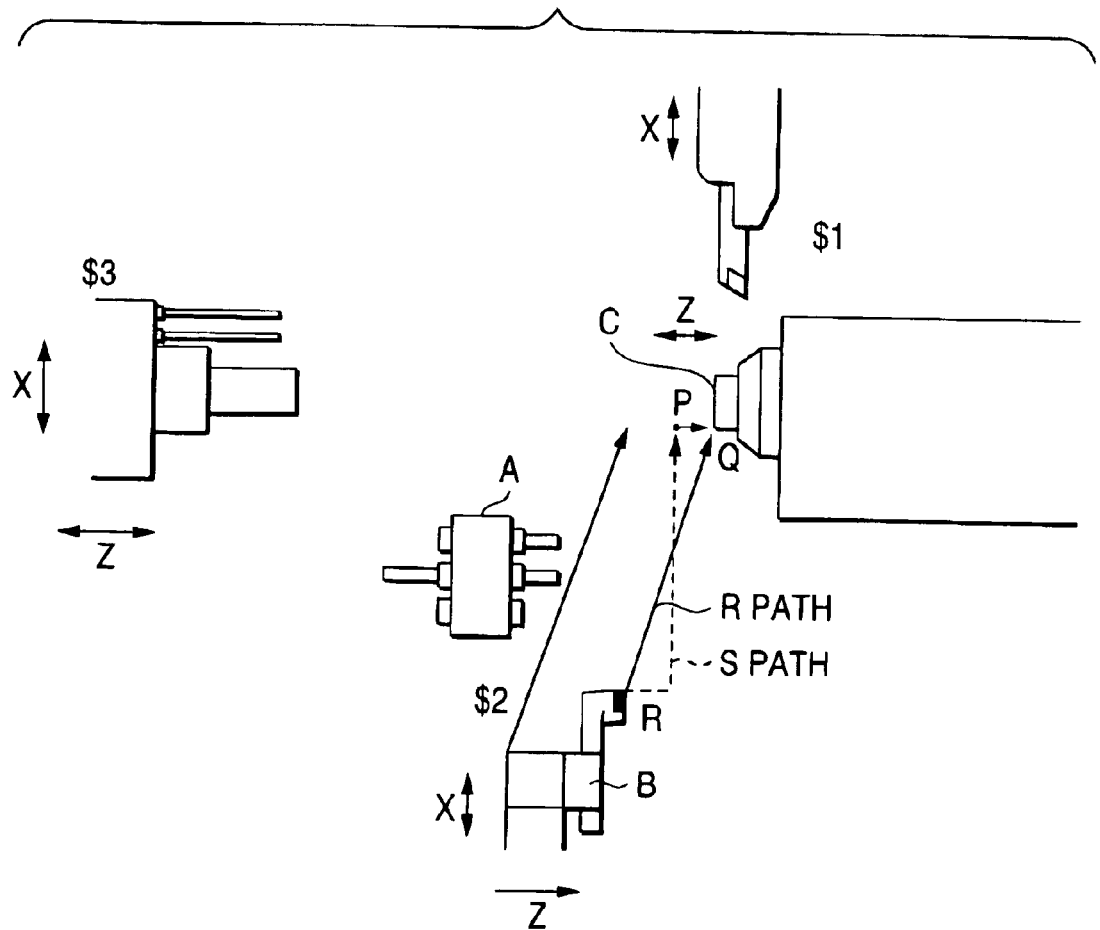
FIG. 9 is a diagram describing an action of the resumption return invalid spindle of the program resumption function according to the first embodiment of the present invention.

As a result of this, for example, in the case that a tool B does not interfere with a fixed tool rest A when the tool B moves to a point Q (a positioning position after the machining resumption) in the vicinity of a machined work C as shown by a path R of FIG. 9, it is not necessarily necessary for the operator to return the tool B to a resumption position P through a path S by manual manipulation and position the tool B to the point Q by a machining program command after the machining resumption. Therefore, in the present case, the operator can move the tool B to the point Q directly through the path R by the machining program command after the machining resumption by turning on a spindle position return invalid switch of a spindle for controlling the tool B.

As seen by the above description, in accordance with the numerical control apparatus according to this invention, by a simple configuration, an action (machining) of a machine for machining a multiple-system machining program is halted and after evacuating and replacing a tool, the evacuated tool is returned to the resumption position and then the synchronous relation between the systems can be restored to resume the machining.

Also, even when the operator changes the override value before the machining halt and at the beginning of the machining resumption, the synchronous relation between the systems can accurately be restored to resume the machining. For example, when machining is performed by an override of 50% before a machining halt and the machining is resumed by an override of 20% after the machining halt, the synchronous relation between the systems can accurately be restored in a state of the override of 20% to resume the machining.

Also, in accordance with the numerical control apparatus according to this invention, even when a spindle which does not return to the resumption position resides, the program resumption function can be performed.

Further, in accordance with the numerical control apparatus according to this invention, even in a machining program in which a reference point return command of G28 etc. is absent in the head of the machining program and a machine coordinate value does not return to an initial value (a machine does not return to an initial position), a position deviation does not occur and the machining can be resumed.

INDUSTRIAL APPLICABILITY

As described above, a numerical control apparatus according to this invention is particularly suitable for use as a numerical control apparatus in correspondence with multiple systems capable of executing machining programs in parallel.

What is claimed is:

1. A numerical control apparatus in correspondence with multiple systems capable of executing machining programs in parallel, comprising:
   sampling means for sampling block end information of each system program;
   means for identifying a resumption block and a resumption position of each system based on the block end information of each system at the time of a machining halt; and
   means for calculating information about a synchronous relation between the systems from the block end information of each system and resuming and starting each system based on this calculated result when machining is resumed from the resumption position.

2. A numerical control apparatus as claimed in claim 1, wherein the block end information for identifying the resumption position and the resumption block comprises a block end time of each system, a machine coordinate value of each control spindle and a block number of the machining program of each system.

3. A numerical control apparatus as claimed in claim 1, wherein the block end information for identifying the resumption position and the resumption block comprises a block end time of each system, a machine coordinate value of each control spindle, a block number of the machining program of each system and an override value.

4. A numerical control apparatus as claimed in claim 2, wherein the information about a synchronous relation between the systems at the time of machining resumption is starting latency time calculated from the block end time of each system.

5. A numerical control apparatus as claimed in claim 3, wherein the information about a synchronous relation between the systems at the time of machining resumption is starting latency time calculated from the block end time of each system program and the override value.

6. A numerical control apparatus as claimed in claim 4 or 5, wherein the machining resumption from the resumption position starts from the system with starting latency time of zero and sequentially starts from the system in which execution time matches with starting latency time.

7. A numerical control apparatus as claimed in claim 1, further comprising means for resuming machining after the machining halt without returning an evacuated control spindle to the resumption position before machining resumption.

8. A numerical control apparatus as claimed in claim 7, further comprising means for checking whether an absolute position movement command is described with respect to all control spindles belonging to the system to which a control spindle which does not return to a resumption position belongs in a movement block subsequent to machining resumption of the system.

9. A numerical control apparatus as claimed in claim 1, further comprising means for storing a coordinate value of each control spindle at the time of a machining start, and means for restoring the coordinate value of each control spindle stored before performing a search for resuming machining after the machining halt.

10. A numerical control apparatus as claimed in claim 1, wherein the machining resumption from the resumption position starts from the reference system having a starting latency time adjusted to zero, wherein latency starting times of said other systems are adjusted in accordance with the starting latency time of the reference system, and wherein the other systems are sequentially started when execution time matches with the latency starting times of the other systems.

11. A numerical control apparatus as claimed in claim 1, further comprising means for identifying a reference system from said multiple systems, wherein the block end information for identifying the resumption position and the resumption block comprises a block end time of each system, a machine coordinate value of any controlled machining element and a block number of the machining program of each system, and wherein the reference system has a shortest block end time in comparison to other systems from said multiple systems.

* * * * *